(12) United States Patent
Huang et al.

(10) Patent No.: US 11,421,573 B1
(45) Date of Patent: Aug. 23, 2022

(54) DEF SYSTEM

(71) Applicant: DEERE & COMPANY, Moline, IL (US)

(72) Inventors: Shyan-Cherng Huang, Cedar Falls, IA (US); Kiran Shekarappa, Bangalore (IN)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 17/178,025

(22) Filed: Feb. 17, 2021

(51) Int. Cl.
*F01N 3/20* (2006.01)
*F01N 3/28* (2006.01)
*B01D 53/94* (2006.01)
*B05B 17/06* (2006.01)

(52) U.S. Cl.
CPC ....... *F01N 3/2066* (2013.01); *B01D 53/9418* (2013.01); *B01D 53/9431* (2013.01); *B01D 53/9436* (2013.01); *B01D 53/9477* (2013.01); *F01N 3/2892* (2013.01); *B01D 2255/904* (2013.01); *B05B 17/0607* (2013.01); *F01N 2610/02* (2013.01); *F01N 2610/1453* (2013.01)

(58) Field of Classification Search
CPC combination set(s) only.
See application file for complete search history.

(56) References Cited

U.S. PATENT DOCUMENTS

| | | | |
|---|---|---|---|
| 6,173,568 B1* | 1/2001 | Zurbig | B01D 53/9495 60/274 |
| 8,261,538 B2* | 9/2012 | Kistner | F01N 3/106 60/295 |
| 9,644,516 B1* | 5/2017 | Chiruta | B01F 3/04049 |
| 10,378,413 B2* | 8/2019 | Zhang | B01F 5/0689 |
| 2004/0124259 A1* | 7/2004 | Guezennec | F01N 3/2013 239/135 |
| 2005/0000208 A1* | 1/2005 | Liu | F01N 3/0842 60/286 |
| 2005/0013756 A1* | 1/2005 | Amou | B01D 53/9495 423/239.1 |

FOREIGN PATENT DOCUMENTS

| | | |
|---|---|---|
| CN | 105019988 A | 11/2015 |
| GB | 941181 A | 11/1963 |
| KR | 100907418 B1 | 7/2009 |

* cited by examiner

*Primary Examiner* — Binh Q Tran
(74) *Attorney, Agent, or Firm* — Michael Best & Friedrich LLP

(57) ABSTRACT

A DEF system for use with an internal combustion engine, the DEF system including a primary flowpath extending between a first inlet and a first outlet, where the first inlet is open to and configured to receive exhaust gasses from the internal combustion engine. The DEF system also includes a secondary flowpath including a second inlet open to the primary flowpath downstream of the first inlet and upstream of the first outlet, a second outlet open to the primary flowpath downstream of the secondary inlet and upstream of the first outlet, and an injector assembly configured to inject DEF into the secondary flowpath.

19 Claims, 2 Drawing Sheets

DEF SYSTEM

FIELD OF THE INVENTION

The present disclosure relates to a diesel exhaust fluid injector system for use with an internal combustion engine.

BACKGROUND

To improve emissions, diesel internal combustion engines include some form of injection system to inject exhaust fluid (e.g., diesel exhaust fluid or DEF) into the exhaust gasses to neutralize nitrous oxides contained therein.

SUMMARY

In one implementation, a DEF system for use with an internal combustion engine, the DEF system including a primary flowpath extending between a first inlet and a first outlet, where the first inlet is open to and configured to receive exhaust gasses from the internal combustion engine, a secondary flowpath including a second inlet open to the primary flowpath downstream of the first inlet and upstream of the first outlet, a second outlet open to the primary flowpath downstream of the secondary inlet and upstream of the first outlet, and an injector assembly configured to inject DEF into the secondary flowpath.

In another implementation, a DEF system for use with an internal combustion engine configured to output a flow of exhaust gasses, the DEF system including a first flowpath configured to receive a first portion of the flow of exhaust gasses, a second flowpath parallel to the first flow path and configured to receive a second portion of the flow of exhaust gasses, and an injector assembly configured to inject DEF droplets into the second portion of the flow of exhaust gasses.

In another implementation, a DEF system for use with an internal combustion engine, the DEF system including a first flowpath at least partially defined by a first tube having a first outer wall, where the first flowpath defines a first channel axis, the first flowpath having a first inlet open to the internal combustion engine and a first outlet downstream of the first inlet, a second flowpath at least partially defined by a second tube having a second outer wall, the second flowpath having a second inlet open to the first passageway and a second outlet open to the first passageway, where the second outlet defines an injection chamber completely encompassing the first outer wall of the first flowpath, and where the injection chamber includes a plurality of ports extending between and in fluid communication with both the first flowpath and the injection chamber, and an injector assembly configured to inject DEF into at least one of the first flowpath and the second flowpath.

In another implementation, a DEF system for use with an internal combustion engine, the DEF system including a passageway having an inlet open to the internal combustion engine and an outlet, a mixing chamber open to the passageway, an ultrasonic DEF injection system configured to inject DEF droplets into the mixing chamber having a predetermined target diameter between 2 to 25 microns.

Other aspects of the disclosure will become apparent by consideration of the detailed description and accompanying drawings.

DETAILED DESCRIPTION

Before any embodiments of the disclosure are explained in detail, it is to be understood that the disclosure is not limited in its application to the details of the formation and arrangement of components set forth in the following description or illustrated in the accompanying drawings. The disclosure is capable of supporting other implementations and of being practiced or of being carried out in various ways.

This disclosure generally relates to a diesel exhaust fluid (DEF) system configured to inject a predetermined volume of DEF into the exhaust gasses of an internal combustion engine (ICE) whereby the combined flow of intermixed DEF droplets and exhaust gasses are passed through an exhaust gas treatment element (EGTE) to undergo treatment. More specifically, the DEF system includes both a primary and secondary flowpaths oriented so that a portion of the exhaust gasses are siphoned off from the primary flowpath and directed into the secondary flowpath where they are heated and mixed with atomized DEF in a mixing chamber. More specifically, an ultrasonic injector injects a volume of DEF droplets at a predetermined target droplet diameter into the chamber to be mixed with the siphoned off exhaust gasses. By introducing the DEF droplets into the heated, secondary flow of exhaust gasses, the DEF more readily evaporates into ammonia and avoids unwanted crystallization. With the DEF introduced into the siphoned off gasses, the resulting mixture is injected back into the primary exhaust stream through an injection head having multiple ports contained therein. Finally, the fully mixed gasses flow through an exhaust gas treatment element where the gasses undergo treatment and are subsequently released into the atmosphere.

Figure 1:
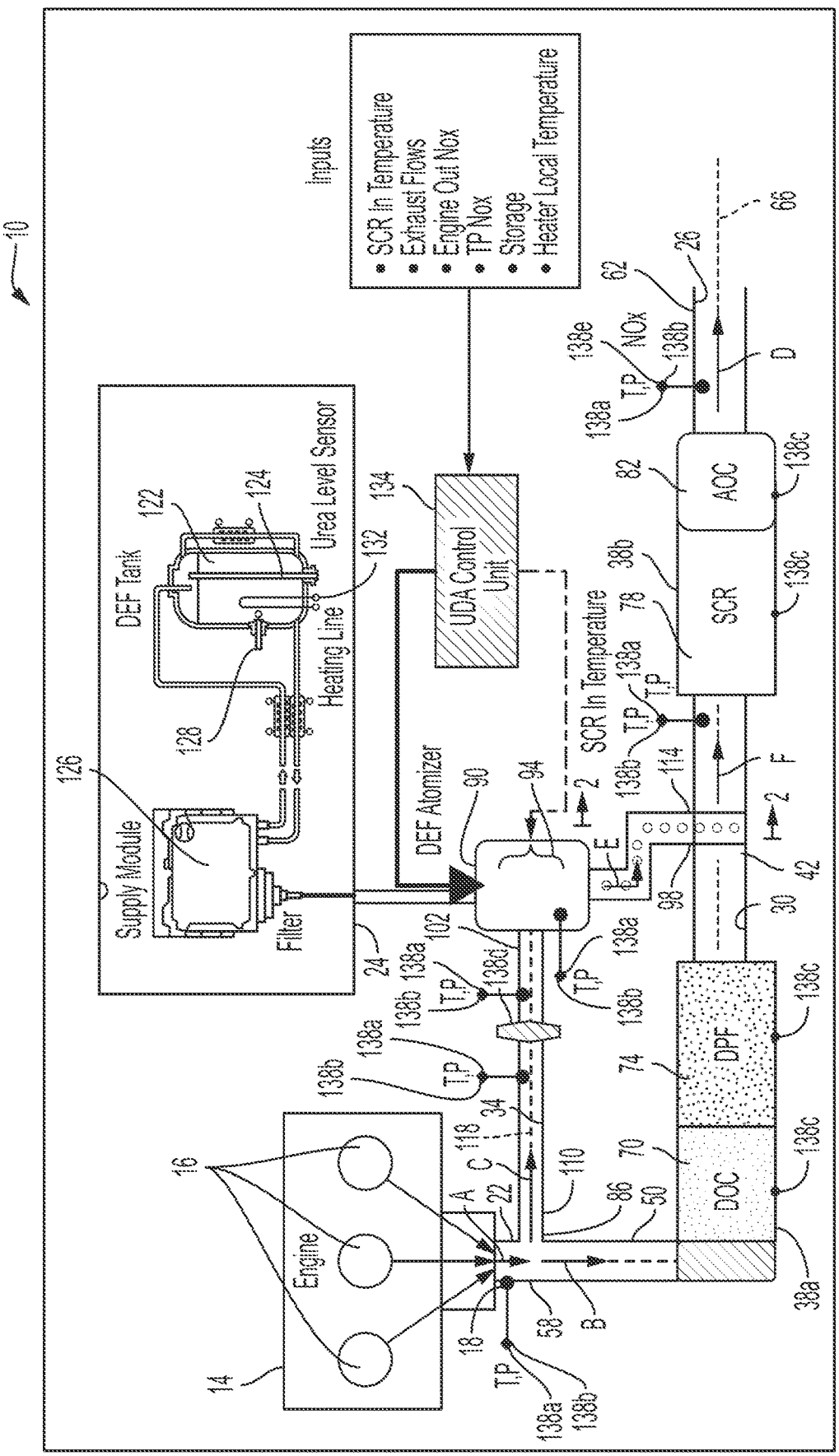
FIG. 1 is a schematic view of the DEF system.

FIG. 1 illustrates a diesel exhaust fluid (DEF) system 10 for use with an internal combustion engine (ICE) 14. As shown in FIG. 1, the ICE 14 is a diesel engine having a plurality of cylinders 16 and an exhaust outlet 18. While the illustrated ICE 14 is a diesel engine, it is understood that the illustrated system may be fit onto a gasoline or other engine type as needed.

During operation of the ICE 14, the cylinders 16, together, output a flow of exhaust gasses A through the exhaust outlet 18. The exhaust gasses A exiting the ICE 14 generally contain particulate matter (PM) and undesirable chemicals such as nitric oxide (NOx), hydrocarbons (HC), carbon monoxide (CO), and the like. To adhere with local emission laws, one or more of these chemicals and particulates must generally be removed from the exhaust gasses or neutralized before the gasses can be released into the atmosphere. In the illustrated embodiment, the ICE 14 also includes a turbocharger 18 through which the flow of exhaust gasses A passes before exiting the exhaust outlet 18. However, in alternative embodiments, the ICE 14 may be naturally aspirated such that the flow of exhaust gasses A only passes through an exhaust manifold or header (not shown) before exiting the exhaust outlet 18. While the illustrated ICE 14 includes a single exhaust outlet 18 feeding a single DEF system 10, it is understood that in alternative embodiments additional exhaust outlets may be present feeding one or more DEF systems 10.

The DEF system 10 is configured to receive the exhaust gasses A from the outlet 18 of the ICE 14, treat the gasses to neutralize or remove the particulates and chemicals contained therein, and release the resulting treated gasses into the atmosphere. The DEF system 10 includes an inlet 22 coupled to and configured to receive the flow of exhaust gasses A from the exhaust outlet 18 of the ICE 14, an injection assembly 24 for introducing DEF into the DEF system 10, one or more exhaust gas treatment elements (EGTE) 38a, 38b, and an outlet 26 through which the treated exhaust gasses D are exhausted into the atmosphere. The DEF system 10 also includes a controller 134 in operable communication with the injection assembly 24, EGTEs 38a, 38b, and the like that is configured to control, among other things, the rate and manner in which DEF is injected into the exhaust gasses and the manner in which the exhaust gasses are treated.

The DEF system 10 also includes a primary exhaust flowpath 30 extending between the inlet 22 and the outlet 26 and configured to flow a first portion B of the exhaust gas flow A therethrough. The primary exhaust flowpath 30 includes a first EGTE 38a, a merge site 42 downstream of the first EGTE 38a where the secondary exhaust flowpath 34 is introduced back into the primary flowpath 30, and a second EGTE 38b downstream from the merge site 42. During use, the first portion B of the exhaust gas flow is directed through the first EGTE 38a where a first set of treatment actions occur. The first portion B is then merged with gasses from the secondary flowpath 34 (described below) to produce a second DEF/exhaust mixture F. The second DEF/exhaust mixture F is then directed through the second EGTE 38b where a second set of treatment actions occur and producing the flow of treated exhaust gasses D. Finally, the treated exhaust gasses D are exhausted into the atmosphere.

The primary exhaust flowpath 30 is at least partially formed by a length of tubing 50 through which the first portion B of exhaust gasses flows. The tubing 50, in turn, includes an outer wall 54 at least partially forming the flowpath 30, a first end 58, and a second end 62 opposite the first end 58. In the illustrated embodiment, the first end 58 of the tubing 50 generally corresponds with the inlet 22 while the second end 62 of the tubing 50 generally corresponds with the outlet 26. The primary flowpath 30 also defines a channel axis 66 extending along the length of the flowpath 30.

In the illustrated embodiment, the outer wall 54 of the tubing 50 is substantially annular in cross-sectional shape causing the flowpath 30 to have a substantially circular cross-sectional shape with the axis 66 located at the radial center thereof. However, in alternative embodiments, other flowpath cross-sectional shapes and sizes may be present (e.g., square, rectangle, polygonal, and the like). Furthermore, while the illustrated flowpath 30 is substantially constant in cross-sectional shape, it is understood that the cross-sectional shape of the flowpath 30 may vary over the length thereof.

The first EGTE 38a is a dual-purpose unit including a diesel oxidation catalyst (DOC) element 70 and a diesel particular filter (DPF) element 74. Generally speaking, the DOC 70 is a flow-through filter that contains precious metals configured to reduce the CO, HC, and PM levels within the exhaust gasses. The DPF 74, in contrast, is a wall-flow filter configured to remove any remaining soot that the DOC 70 was unable to oxidize.

The second EGTE 38b is also a dual-purpose unit including a selective catalytic reduction (SCR) element 78 and an ammonia oxidation catalyst (AOC) element 82. Generally speaking, the SCR 78 is formed from ceramic materials and is configured to react with the DEF introduced into the exhaust stream to convert Nitrogen Oxides (NOx) into diatomic Nitrogen ($N_2$) and water. The AOC 82, in contrast, is configured to oxidize any remaining ammonia left over from the previous reactions before the gasses leave the system via the outlet 26.

While the illustrated DEF system 10 includes two dual-purpose EGTEs 38a, 38b placed in series to produce a four-step exhaust gas treatment process (see FIG. 1), it is understood that in alternative embodiments more or fewer types and styles of EGTEs may be used depending on which exhaust treatment capabilities the DEF system 10 is intended to carry out and the exact type of fuel being used by the ICE 14. Furthermore, the packaging of the EGTEs within the first flowpath 30 may also be varied. For example, one or more single purpose EGTEs may be mounted in series or parallel to each other. In other embodiments, one or more multi-purpose EGTEs may be used. In still other embodiments, a combination of single and multi-purpose EGTEs may be mounted in series or parallel with each other.

The DEF system 10 also includes a secondary exhaust flowpath 34. The secondary exhaust flowpath 34 branches off from the primary exhaust flowpath 30 running parallel to at least a portion thereof. The secondary exhaust flowpath 34 includes a secondary inlet 86 open to the primary exhaust flowpath 30, a mixing chamber 90, the injection assembly 24, a heating unit 94, and a secondary outlet 98 open to the primary exhaust flowpath 30 at a location downstream from where the secondary inlet 86 is open to the primary exhaust flowpath 30. During use, a second portion C of the exhaust gas flow are siphoned away from the first portion B of the exhaust gas flow and directed into the secondary exhaust flowpath 34 via the secondary inlet 86. As the second portion B flows through the secondary exhaust flowpath 34, the second portion C is heated and mixed with a predetermined volume of DEF droplets to produce a first DEF/Exhaust mixture E. The first mixture E is then blended back into the first portion B of the exhaust gas flow (e.g., via the secondary outlet 98) to produce a second DEF/Exhaust mixture F.

In the illustrated embodiment, the secondary inlet 34 is positioned downstream from the inlet 22 and upstream of the first EGTE 38a and configured to siphon a pre-determined proportion of the exhaust gas flow A therefrom. However, in alternative embodiments where more than one exhaust outlet 18 is present in the ICE 14, the secondary inlet 34 may be attached to a secondary exhaust outlet of the ICE 14, different from the exhaust outlet to which the primary flowpath 30 is attached, directly.

Similar to the primary exhaust flowpath 30, the secondary exhaust flowpath 34 is at least partially formed by a length of tubing 102 through which the second portion C of exhaust gasses flows. The tubing 102, in turn, includes an outer wall 106, a first end 110, and a second end 114 opposite the first end 110. In the illustrated embodiment, the first end 110 of the tubing 102 corresponds with the secondary inlet 86 while the second end 114 corresponds with the secondary outlet 98. The secondary flowpath 34 also defines a secondary channel axis 118 extending along the length thereof.

In the illustrated embodiment, the outer wall 106 of the secondary exhaust flowpath 34 is substantially annular in cross-sectional shape causing the secondary flowpath 34 to have a substantially circular cross-sectional shape with the axis at the center thereof. However, in alternative embodiments, the different cross-sectional flowpath shapes may be present.

The mixing chamber 90 of the secondary flowpath 34 includes a sub-volume within the flowpath 34 where the DEF is introduced into and mixed together with the second portion C of the exhaust flow. In the illustrated embodiment, the mixing chamber 90 is an enlarged chamber or volume positioned in the flowpath 34 between the secondary inlet 86 and the secondary outlet 98. Although not shown, the mixing chamber 90 may include baffles, fins, and the like to help control the flow of exhaust gasses and DEF droplets and promote mixing therein. While the illustrated mixing chamber 90 includes a substantially rectangular chamber spliced into the length of tubing 102, it is understood that in alternative embodiments different sizes and shapes of mixing chamber 90 may be present such as, but not limited to, a length of enlarged tubing (e.g., tubing having a similar but larger cross-sectional shape), a spherical chamber, polygonal chamber, and the like.

As shown in FIG. 1, the injection system 24 is configured to introduce a predetermined volume of DEF droplets into the secondary flowpath 34 at a predetermined target droplet diameter. More specifically, the injection system 24 includes a DEF reservoir or tank 122, a DEF supply module 126, and a DEF atomizer 130. The DEF tank 122 is configured to store a volume of liquid DEF or other treatment liquids therein. As shown in FIG. 1, the tank 122 may include a DEF level sensor 124, a temperature sensor 128, and a heater 132 to keep the liquid DEF from freezing while being stored.

The DEF supply module 126 generally contains a series of valves and pumps and is configured to draw DEF from the DEF reservoir 122 and supply a predetermined volume of DEF to the DEF atomizer 130. The DEF supply module 126 is in operable communication with the DEF controller 134 (described below) which instructs the module 126 at which flow rate and pressure to provide DEF to the atomizer 130. In some embodiments, the supply module 126 may also include a filter (not shown) or other elements configured to prepare the DEF for atomization and introduction into the exhaust flow.

The DEF atomizer 130 is configured to receive a predetermined volume of DEF from the supply module 126 and atomize the DEF into droplets having a predetermined target droplet diameter for subsequent introduction into the second portion C of the exhaust flow. For the purposes of this application, the "target" diameter is the diameter of droplet the atomizer 130 is attempting to produce although it is understood that a distribution of droplet diameters generally centered on the target diameter (e.g., both larger and smaller) may actually result.

In the illustrated embodiment, the atomizer 130 is an ultrasonic device using ultrasonic waves to shape and form the droplets as they are introduced into the secondary flowpath 34. During use, the atomizer 130 may adjust the frequency and amplitude of the ultrasonic waves interacting with the liquid DEF to control the droplet characteristics of the DEF being introduced into the secondary flowpath 34. Such adjustable characteristics may include target droplet diameter, average droplet diameter, droplet diameter distribution, and the like.

In the illustrated embodiment, the atomizer 130 is configured to produce DEF droplets having a target diameter or average droplet diameter between 2-30 microns. In alternative embodiments the atomizer 130 may be configured to produce droplets between 2-25 microns in diameter. In still other embodiments, the atomizer 130 may be configured to produce droplets between 2-15 microns in diameter. In still other embodiments, the atomizer 130 may be configured to produce droplets between 10-15 microns in diameter. In still other embodiments, the atomizer 130 may be configured to produce droplets between 3-6 microns in diameter. In still other embodiments, the atomizer 130 may be configured to produce droplets between 3-9 microns in diameter. Generally speaking, the target or average droplet diameters produced by the ultrasonic atomizer 130 are smaller than the DEF droplets produced by traditional mechanical injectors which typically produce droplets having a target diameter or average diameter between 40-60 microns. By producing DEF droplets having a smaller target diameter, the DEF is able to more quickly and easily vaporize into ammonia ($NH_3$) during use and avoid crystallization. Furthermore, DEF droplets of a smaller diameter also allow for the vaporization into ammonia to occur at a lower temperature within the exhaust gas flow.

The heating unit 94 is configured to heat the gasses and droplets contained within the secondary flowpath 34. More specifically, the heating unit 94 is configured to elevate the relative temperature within the mixing chamber 90 (e.g., the temperature of the second portion C of the exhaust gasses and/or the DEF droplets contained therein) to promote the vaporization of the DEF into ammonia as it mixes with the second portion C of the exhaust gasses. In the illustrated embodiment, the heating unit 94 includes an electric coil or element positioned within mixing chamber 90 of the secondary flowpath 34.

In the illustrated embodiment, the heating unit 94 is in operable communication with the controller 134 and able to actively adjust the target temperatures within secondary flowpath 34. Such targets may include, but are not limited to, a predetermined ambient temperature within the mixing chamber 90, a target temperature increase over the initial temperature of the exhaust gasses leaving the ICE 14, a target DEF droplet temperature, a target temperature at a particular location within the DEF system 10 (e.g., at the secondary outlet 98, within the mixing chamber 90, at the merge site 42, at the second EGTE 38b, and the like).

While the illustrated heating unit 94 is shown positioned within and heating the volume of the mixing chamber 90, it is understood that in alternative embodiments the heating unit 94 may be positioned anywhere along the secondary exhaust flowpath 34 (e.g., at the secondary inlet 86, within the tubing 102, at the secondary outlet 98, and the like). In still other embodiments, additional heating units 94 may be present at multiple locations. In still other embodiments, the heating unit 94 may be incorporated into or work together with the atomizer 130 so that the DEF itself is heated directly either prior to or as the DEF is being atomized. In still other embodiments, a combination of heating units 94 in the secondary flowpath 34 and atomizer 130 may be present.

While the atomizer 130, supply module 126, tank 122, heating unit 94, and controller 134 are illustrated as separate elements, it is understood that in alternative embodiments, the atomizer 130, supply module 126, DEF tank 122, heating unit 94, and controller 134 may all be integrated together as a single unit or into a number of sub-units.

The secondary outlet 98 is positioned downstream of the first EGTE 38a and upstream of the second EGTE 38b. During use the secondary outlet is configured to evenly blend the first DEF/exhaust mixture E of the secondary flowpath 34 with the second portion B of the exhaust flowpath to produce the second DEF/exhaust mixture F (see FIGS. 1 and 2).

Figure 2:
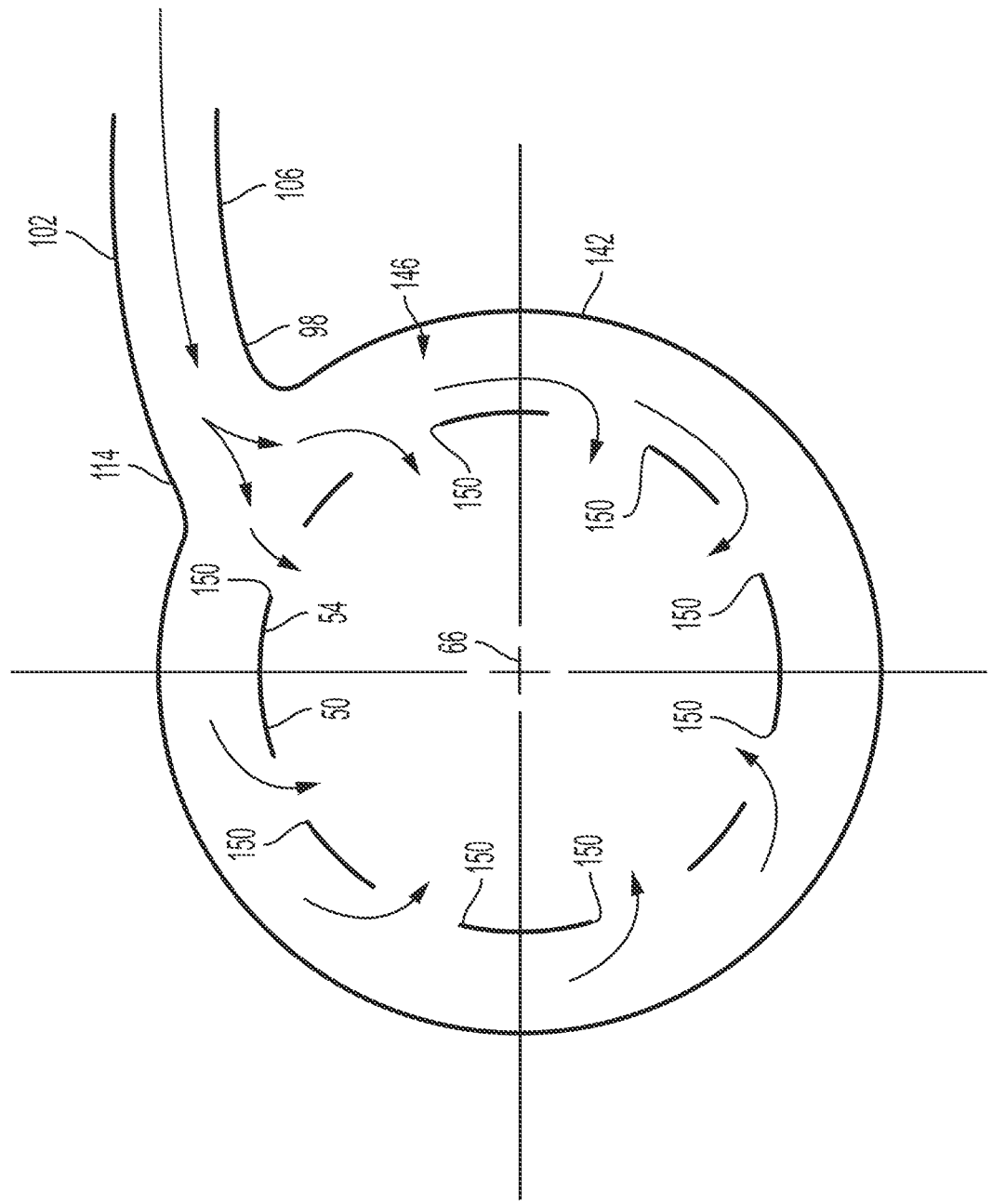
FIG. 2 is a cross-sectional view taken along line 2-2 of FIG. 1.

As shown in FIG. 2, the secondary outlet 98 includes a multipoint DEF injector 142. The DEF injector 142, in turn, includes an outlet chamber 146 fed by the secondary flowpath 34 and completely encompassing the primary flowpath 30 generally perpendicular to the channel axis 66. The multipoint DEF injector 142 also includes a plurality of nozzles or ports 150 extending between and in fluid communication with both the outlet chamber 146 and the primary flowpath 30.

In the illustrated embodiment, the outlet chamber 146 completely encompasses (e.g., extends 360 degrees around) and is at least partially defined by the outer wall 54 of the tubing 50 forming the primary flowpath 30. More specifically, the outlet chamber 146 has a substantially rectangular-toroid shape oriented perpendicular to the channel axis 66 with the outer wall 54 of the tubing 50 forming the inner wall of the chamber 146. While the illustrated outlet chamber 146 is substantially equal in cross-sectional shape about the entire periphery of the outer wall 54, in alternative embodiments the size and shape of the chamber 146 may vary to promote an even flow rate of gasses to all areas about the periphery of the flowpath 30. In still other embodiments, baffles or fins may be present to promote the flow of gasses to all areas of the chamber 146.

As shown in FIG. 2, each port 150 of the multipoint DEF injector 142 includes an aperture formed into the outer wall 54 of the tubing 50. In the illustrated embodiment, the ports 150 are spaced evenly about the entire periphery of the outer wall 54, however, in alternative embodiments different patterns or layouts of ports 150 may be used to promote more even mixing of the two flows. Furthermore, while the illustrated ports 150 include apertures formed into the outer wall 54, in alternative embodiments the nozzles may include elongated structures extending radially inwardly into the primary flowpath 30. In such embodiments, the elongated ports 150 may terminate at varying radial distances into the flowpath 30 to promote more even blending of the flows.

The controller 134 of the DEF system 10 is in operable communication with the atomizer 130, the supply module 126, the tank 122, the heating unit 94, and one or more sensors 138a-e and configured to control the operation of the DEF system 10 to produce the desired exhaust treatment results. More specifically, the controller 134 is configured to monitor the operation of the ICE 14 and DEF system 10 via the one or more sensors 138a-e, enter the data into one or more operating algorithms, and output signals to the atomizer 130, supply module 126, and heating unit 94 to dictate, among other things, the target diameter of the DEF droplets being introduced into the secondary flowpath 34, the volume of DEF droplets being introduced into the secondary flowpath 34, and the target temperatures of the secondary flowpath 34 at one or more locations. In some embodiments, the controller 134 may also control (via a valve in the secondary flowpath 34) the proportion of the exhaust flow A that is siphoned off into the secondary flowpath 34 (e.g., the relative flow of the second portion C relative to the first portion B). To make such determinations the controller 134 may at least partially consider any one of or combination of: user inputs and operating modes, the operating temperature of the first or second EGTEs 38a, 38b, the current operating temperature in the mixing chamber 90, the rate of exhaust flow into the DEF system 10, the NOx level in the exhaust flow A entering the DEF system 10, the NOx level at the entrance to the second EGTE 38b, the NOx level at the exit of the second EGTE 38b, the volume of DEF remaining in the reservoir 122, the ambient temperature, the operating conditions of the ICE 14, and the like.

During use, the controller 134 receives information from one or more sensors 138a-outputting signals representative of various operating conditions within the ICE 14 and DEF system 10. Such sensors may include, but are not limited to, exhaust gas temperature sensors 138a, exhaust gas pressure sensors 138b, EGTE operating temperature sensors 138c, exhaust gas flow sensors 138d, NOx level sensors 138e, and the like. Such sensors 138a-e may be stand-alone units, combined into multi-purpose units, or virtually produced using software.

During operation of the ICE 14, the operation of the cylinders 16 produces a flow of exhaust gasses A that are discharged through an exhaust outlet 18. After leaving the exhaust outlet 18, the flow of exhaust gasses A enters the DEF system 10 via the inlet 22 where a portion is siphoned off through the secondary inlet 86. This results in a first portion B of the exhaust flow continuing along the primary flowpath 30 and a second portion C of the exhaust flow flowing along the secondary flowpath 34. The relative proportion of the exhaust gasses that are siphoned off may be determined by the controller 134.

After separation, the second portion C of the exhaust flow continues along the secondary flowpath 34 and into the mixing chamber 90. Inside the mixing chamber 90, the second portion C is heated via the heating unit 94 and mixed with a volume of DEF droplets to form the first DEF/exhaust mixture E. The increased temperature from the heating unit 94 and smaller droplet diameter produced by the atomizer 130 promotes the vaporization of the DEF into ammonia. The target diameter of the droplets and volume of droplets distributed is controlled by the controller 134.

The first DEF/exhaust mixture E then exits the mixing chamber 90 and flows into the outlet chamber 146 of the multipoint DEF injector 142 where it merges with the first portion B of the exhaust flow via the plurality of ports 150 to produce the second DEF/exhaust mixture F. As stated above, the relative location of the ports 150 help evenly distribute the introduction of the first DEF/exhaust mixture E into the first portion B to produce an even mix.

Looking now to the primary flowpath A, the first portion B of the exhaust flow flows along the primary flowpath 30 where it is directed into the first EGTE 38a to undergo a first treatment stage. As descried above, as the first portion B flows through the first EGTE 38a, the DOC element 70 oxidizes and reduces the levels of PM, HC, and CO contained within the exhaust gasses while the DPF element 74 acts as a filter capturing any remaining soot that the DOC element 70 was unable to oxidize.

After undergoing the first stage of treatment, the first portion B of the exhaust flow then enters the merge site 42 whereby the first DEF/exhaust mixture E is re-mixed with the first portion B to produce the second DEF/exhaust mixture F (described above). The resulting mixture F is then directed into the second EGTE 38b where it undergoes a second treatment stage to produce the flow of treated exhaust gasses D. As described above, while flowing through the second EGTE 38b, the SCR element 78 reacts with the DEF contained within the mixture F to convert NOx into elemental nitrogen and water while the AOC element 82 neutralizes any remaining ammonia. The resulting treated gasses D are then exhausted into the atmosphere.

The invention claimed is:
1. A diesel exhaust fluid (DEF) system for use with an internal combustion engine, the DEF system comprising:
  a primary flowpath extending between a first inlet and a first outlet, wherein the first inlet is open to and configured to receive exhaust gasses from the internal combustion engine;
  a secondary flowpath including:
    a second inlet open to the primary flowpath downstream of the first inlet and upstream of the first outlet, a second outlet open to the primary flowpath downstream of the secondary inlet and upstream of the first outlet;

an injector assembly configured to inject DEF into the secondary flowpath; and a first exhaust gas treatment element, and wherein the first exhaust gas treatment element is in fluid communication with the primary flowpath and positioned downstream of the second inlet and upstream of the second outlet.

2. The DEF system of claim 1, wherein the injector assembly is configured to output DEF droplets between 2-25 microns in diameter.

3. The DEF system of claim 1, wherein the injector assembly includes an ultrasonic atomizer.

4. The DEF system of claim 1, further comprising a heating unit configured to heat exhaust gasses contained within the secondary flowpath.

5. The DEF system of claim 1, wherein the injector assembly is configured to output DEF droplets having a target diameter, and wherein the target diameter is adjustable.

6. The DEF system of claim 1, further comprising a first second exhaust gas treatment element in fluid communication with the primary flowpath and positioned downstream of the second outlet.

7. The DEF system of claim 6, wherein the second exhaust gas treatment element is at least one of a selective catalytic reduction unit and an ammonia oxidation catalyst unit.

8. The DEF system of claim 1, wherein the first exhaust gas treatment element is at least one of a diesel particular filter and a diesel oxidation catalyst.

9. A diesel exhaust fluid (DEF) system for use with an internal combustion engine configured to output a flow of exhaust gasses, the DEF system comprising:

a first flowpath configured to receive a first portion of the flow of exhaust gasses;

a second flowpath parallel to the first flow path and configured to receive a second portion of the flow of exhaust gasses;

an injector assembly configured to inject DEF droplets into the second portion of the flow of exhaust gasses, and wherein the injector assembly is configured to inject DEF droplets having a target diameter, and wherein the target diameter is adjustable.

10. The DEF system of claim 9, further comprising a heating unit configured to heat the second portion of the flow of exhaust gasses and the DEF.

11. A diesel exhaust fluid (DEF) system for use with an internal combustion engine, the DEF system comprising:

a first flowpath at least partially defined by a first tube having a first outer wall, wherein the first flowpath defines a first channel axis, the first flowpath having a first inlet open to the internal combustion engine and a first outlet downstream of the first inlet;

a second flowpath at least partially defined by a second tube having a second outer wall, the second flowpath having a second inlet open to the first passageway and a second outlet open to the first passageway, wherein the second outlet defines an injection chamber completely encompassing the first outer wall of the first flowpath, and wherein the injection chamber includes a plurality of ports extending between and in fluid communication with both the first flowpath and the injection chamber, and wherein each port is formed into the first outer wall and directed radially toward the first channel axis; and an injector assembly configured to inject DEF into at least one of the first flowpath and the second flowpath.

12. The DEF system of claim 11, wherein the second flowpath includes a mixing chamber downstream of the second inlet and upstream of the second outlet.

13. The DEF system of claim 11, further comprising a heating unit configured to heat the DEF contained within the second flowpath.

14. The DEF system of claim 11, wherein the injector assembly includes an ultrasonic injector assembly.

15. The DEF system of claim 11, wherein the ports are positioned equally along the second outer wall.

16. The DEF injection system of claim 11, further comprising a first exhaust gas treatment element open to the first flowpath and positioned downstream of the second outlet.

17. The DEF system of claim 16, further comprising a second exhaust gas treatment element open to the first flowpath and positioned upstream of the second outlet.

18. A diesel exhaust fluid (DEF) system for use with an internal combustion engine, the DEF system comprising:

a passageway having an inlet open to the internal combustion engine and an outlet;

a mixing chamber open to the passageway;

an ultrasonic DEF injection system configured to inject DEF droplets into the mixing chamber having a predetermined target diameter between 2 to 25 microns.

19. The DEF system of claim 18, wherein the target diameter is variable.

* * * * *